United States Patent [19]
Ivansons et al.

[11] Patent Number: 5,397,425
[45] Date of Patent: Mar. 14, 1995

[54] TOTAL CONTAINMENT WELDING OF PLASTIC TUBES

[75] Inventors: Ivars V. Ivansons, Newark; Valdis Ivansons; Dudley W. C. Spencer, both of Wilmington, all of Del.

[73] Assignee: Denco, Inc., Wilmington, Del.

[21] Appl. No.: 158,505

[22] Filed: Nov. 29, 1993

Related U.S. Application Data

[63] Continuation-in-part of Ser. No. 139,833, Oct. 22, 1993, abandoned, which is a continuation-in-part of Ser. No. 965,875, Oct. 23, 1992, Pat. No. 5,279,685, which is a continuation-in-part of Ser. No. 764,249, Sep. 23, 1991, Pat. No. 5,209,800, which is a continuation-in-part of Ser. No. 682,977, Apr. 10, 1991, Pat. No. 5,156,701, which is a continuation-in-part of Ser. No. 604,967, Oct. 29, 1990, abandoned, which is a continuation-in-part of Ser. No. 569,855, Aug. 20, 1990, Pat. No. 5,141,592.

[51] Int. Cl.⁶ .............................................. B32B 31/00
[52] U.S. Cl. .................................. 156/503; 156/304.2; 156/304.5; 156/508; 156/535; 269/157
[58] Field of Search ............... 156/304.2, 304.5, 304.6, 156/502, 503, 508, 535; 269/86, 87.2, 157, 161

[56] References Cited

U.S. PATENT DOCUMENTS

| | | | |
|---|---|---|---|
| 3,729,360 | 4/1973 | McElroy | 156/535 X |
| 3,793,119 | 2/1974 | Province | 156/535 X |
| 4,222,296 | 9/1980 | Christy et al. | 269/157 X |

FOREIGN PATENT DOCUMENTS

| | | | |
|---|---|---|---|
| 0714065 | 2/1980 | U.S.S.R. | 269/157 |

*Primary Examiner*—David A. Simmons
*Assistant Examiner*—Paul M. Rivaro
*Attorney, Agent, or Firm*—Connolly & Hutz

[57] ABSTRACT

A pair of plastic tubes are welded together by mounting each tube in the clamp jaws of a holder. A heated wafer is movably mounted in the gap between the tubes to cause the ends of the tubes to melt. The melted ends of the opposed tubes are pressed into contact with each other to form a welded connection. Each side of the wafer has a scoop to remove excess plastic material at the ends of the tubes to control the size of the weld connection. A pair of structural cam elements is used to create a precise spacing between each set of clamp jaws for guiding the wafer to control the plastic volume of the weld. The resulting weld is independent of rheology of plastic. The same device could also be used for disconnect purposes by cutting through a single tube and forming two tube sections. Unique double jaw construction is also disclosed.

16 Claims, 4 Drawing Sheets

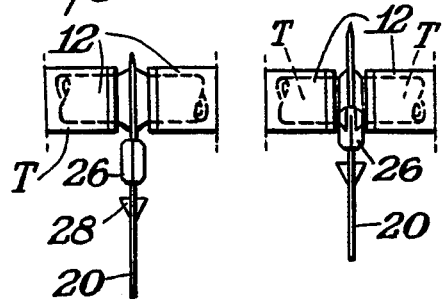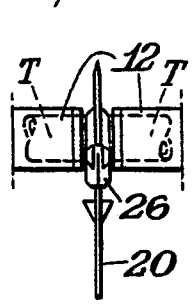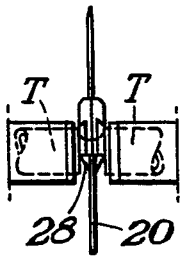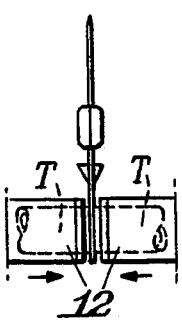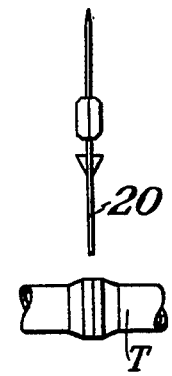
Connect
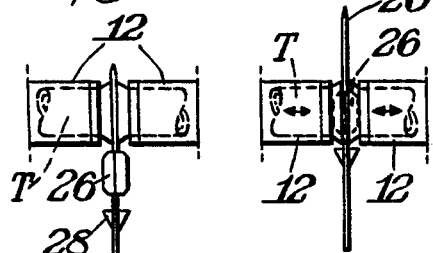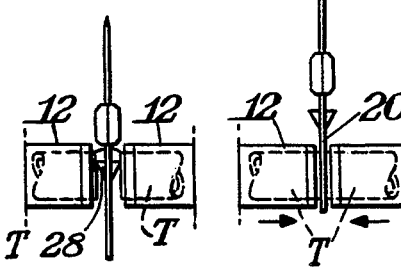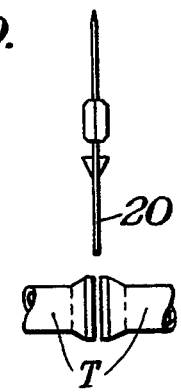
Disconnect
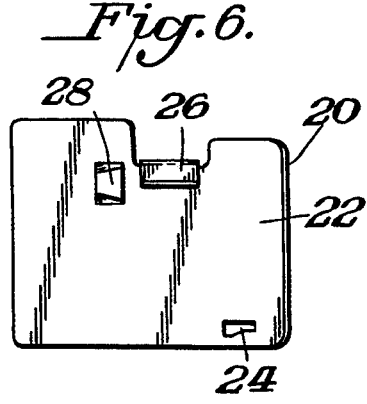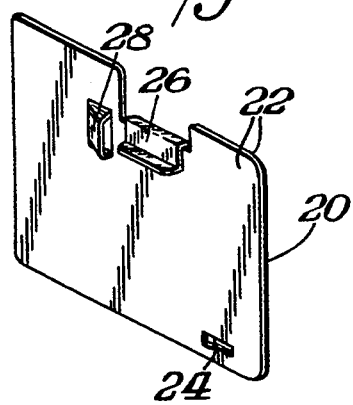

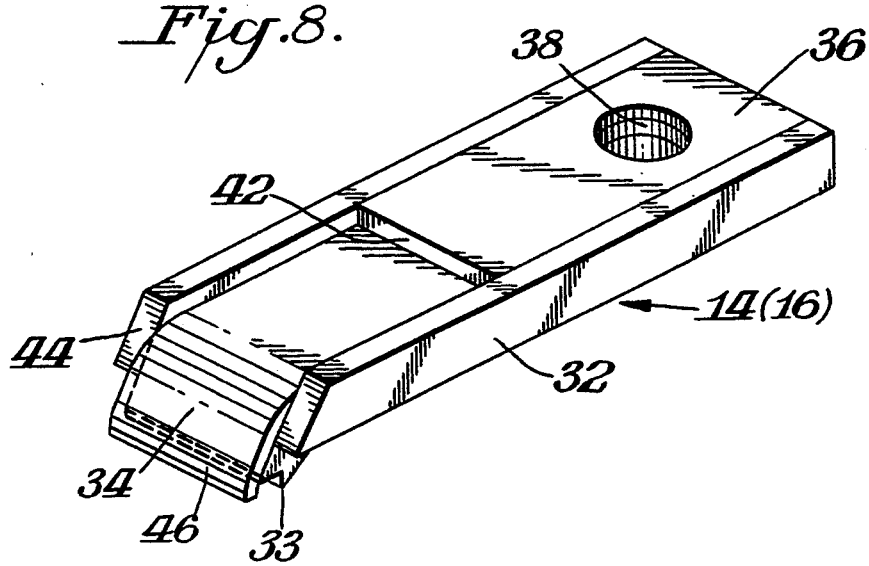
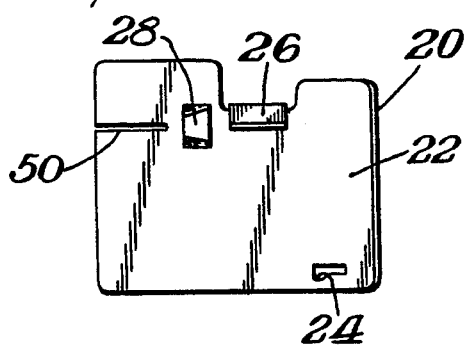
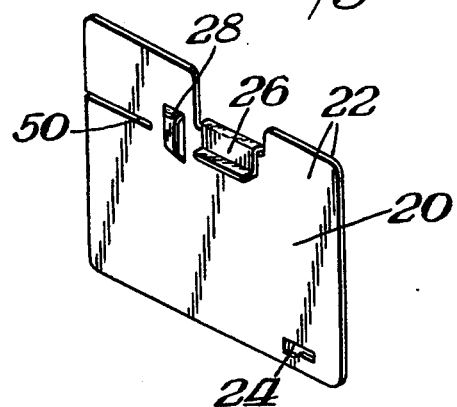
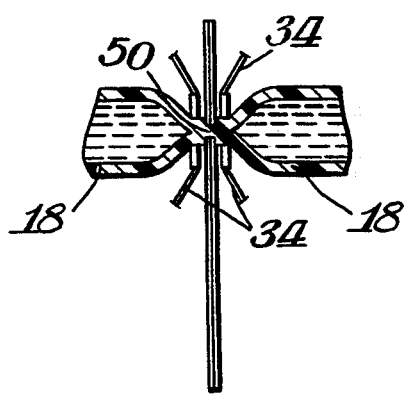
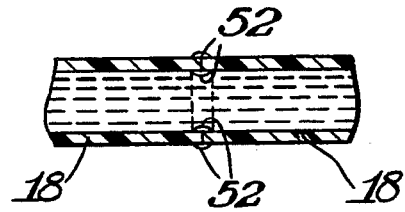

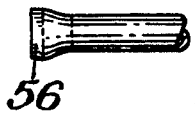
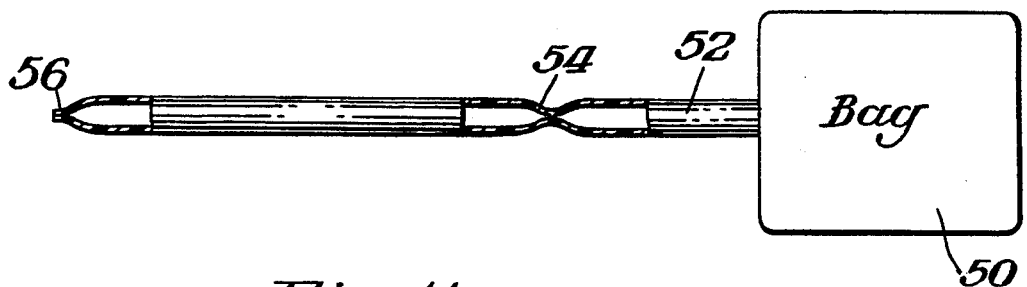
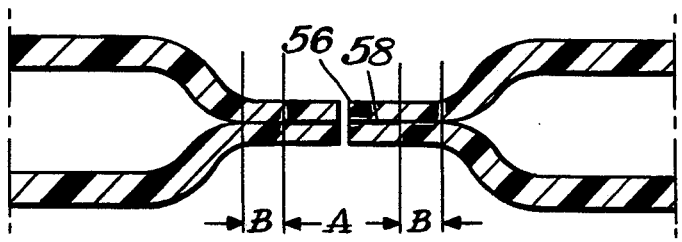
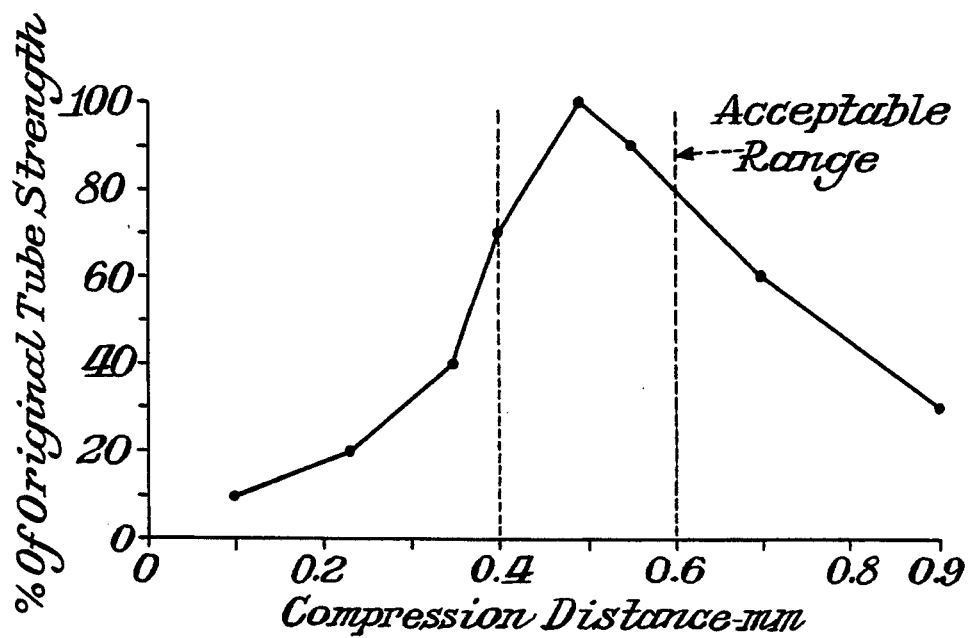

TOTAL CONTAINMENT WELDING OF PLASTIC TUBES

CROSS-REFERENCE TO RELATED APPLICATIONS

This application is a continuation-in-part of application Ser. No. 139,833, filed Oct. 22, 1993, now abandoned, which in turn is a continuation-in-part of application Ser. No. 965,875, filed Oct. 23, 1992, now U.S. Pat. No. 5,279,685, which in turn is a continuation-in-part of application Ser. No. 764,249, filed Sep. 23, 1991, now U.S. Pat. No. 5,209,800, which in turn is a continuation-in-part of application Ser. No. 682,977, filed Apr. 10, 1991, now U.S. Pat. No. 5,156,701, which in turn is a continuation-in-part of application Ser. No. 604,967, filed Oct. 29, 1990, now abandoned which in turn is a continuation-in-part of application Ser. No. 569,855, filed Aug. 20, 1990, now U.S. Pat. No. 5,141,592.

BACKGROUND OF THE INVENTION

The present invention is directed to the total containment welding of plastic tubes. Various prior art exists disclosing different approaches for welding plastic tubes together. Prior patents disclose processes where the weld connection depends on the melt rheology of plastic resulting in nonuniform size of the weld connection. No attempt was made in the prior art to gain control of the size of the weld connection.

Prior art also exists disclosing different approaches to disconnect and seal plastic tubes. Such prior art patents relate to processes where a single clamp jaw of a holder is used to shut off the tubing and to form the seal during disconnect resulting in uncontrolled, nonuniform sealing process.

SUMMARY OF THE INVENTION

An object of this invention is to provide techniques for the sterile or total containment welding of plastic tubes.

A further object of this invention is to provide such techniques which are particularly adaptable for use with the melt/wipe system.

A still further object of this invention is to provide an improved clamp jaw construction for effectively resulting in a sterile sealing of the plastic tubes.

In accordance with this invention a pair of aligned tube holders are spaced from each other to form a gap between the tube holders. Each of the tube holders has a first clamp jaw and a second clamp jaw movable relative to each other to selectively releasably clamp a plastic tube in a general plane between the first clamp jaw and second clamp jaw with a portion of the plastic tube extending into the gap. A wafer is mounted for movement through the gap. The wafer is in the form of a flat plate having opposite sides, each of which is disposed toward a respective set of first and second clamp jaws. Each of the sides of the wafer has an outwardly extending scoop generally located in the plane between the first and second clamp jaws for removing plastic material from the plastic tube as the wafer moves through the gap to control the size of the weld connection.

A further feature of the invention is the provision of a structural cam element on each holder spaced apart to create a precise spacing between the sets of clamp jaws for assuring the proper position of the wafer as it moves through the gap.

In accordance with a further feature of this invention each of the first and second clamp jaws is of double jaw construction having a base member or fixed jaw to which is mounted a spring loaded movable jaw. The spring loaded jaw is preferably mounted to the base member by means of a pressure plate remote from the clamping end of the jaw. The spring loaded jaw element effectively provides a sterile seal of its plastic tube.

THE DRAWINGS

FIGS. 4A-4E are schematic showings of the use of the device shown in FIGS. 1-3 for the connect process;

FIGS. 5A-5E are schematic showings of the use of the device of FIGS. 1-3 for the disconnect process;

FIG. 6 is a side elevational view of a wafer used in the device of FIGS. 1-5;

FIG. 7 is a perspective view of the wafer shown in FIG. 6;

FIG. 8 is a perspective view of a clamp jaw used in the device of FIGS. 1-3;

FIG. 9 is a side elevational view partially broken away of a sealed tube having a bag attached thereto wherein the tube is sealed by use of the device of FIGS. 1-3;

FIG. 10 is a top plan view of the sealed tube shown in FIG. 9;

FIG. 11 is a cross-sectional view illustrating the seal removal and thickness control areas of a plastic tube in accordance with this invention;

FIG. 12 is a graph showing compression distance to effect a high strength seal;

FIG. 13 is a side elevational view of a modified form of wafer in accordance with this invention;

FIG. 14 is a perspective view of a wafer shown in FIG. 13;

FIG. 15 is a cross-sectional view in elevation illustrating use of the wafer shown in FIGS. 13-14; and FIG. 16 is a cross-sectional view in elevation of a butt welded tube using the wafer shown in FIGS. 13-15.

DETAILED DESCRIPTION

Figure 1:
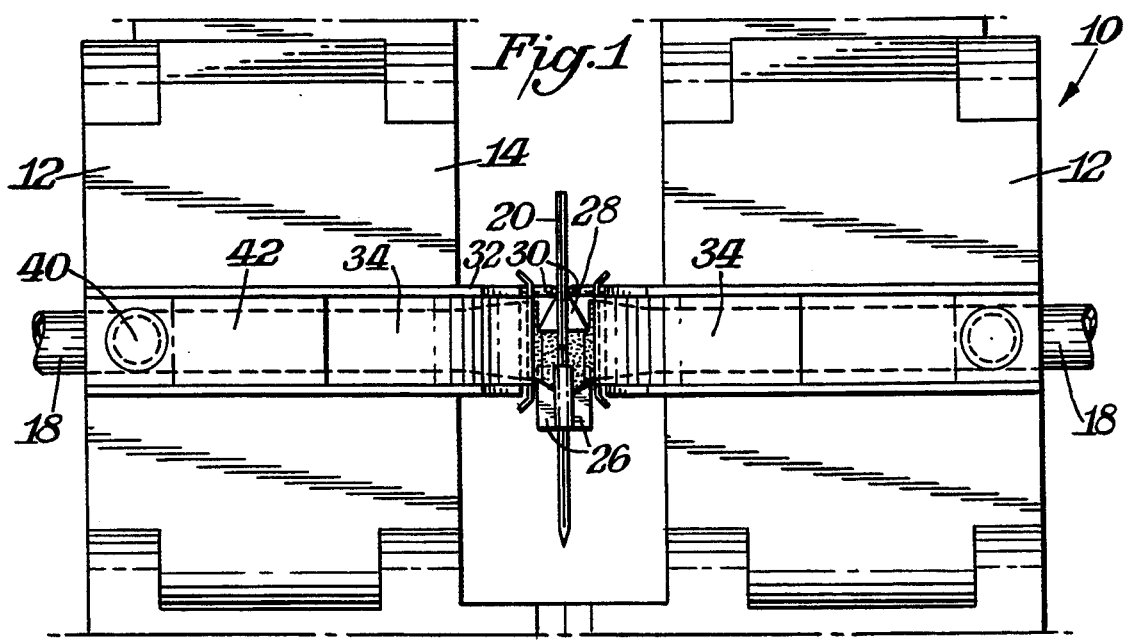
FIG. 1 is a top plan view of a device for selectively connecting and disconnecting plastic tubes.
Figure 2:
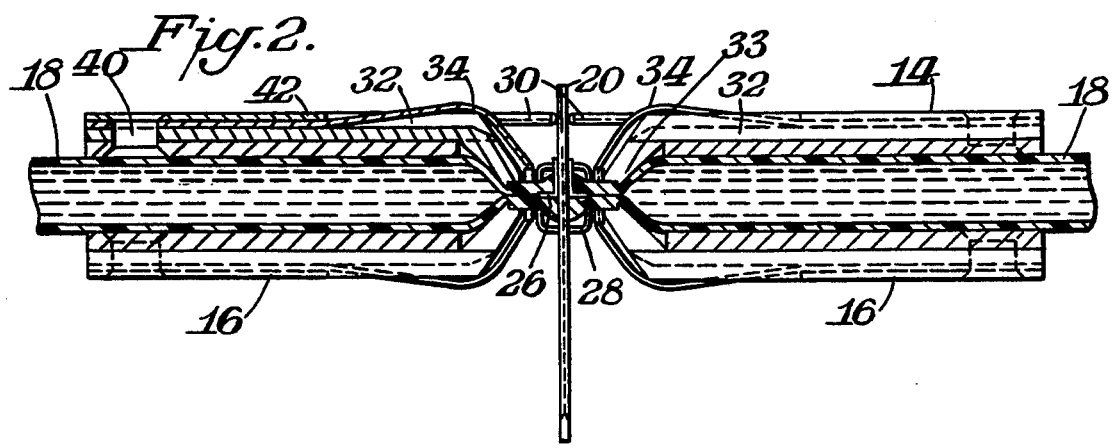
FIG. 2 is a front elevational view in section of the device shown in FIG. 1.
Figure 3:
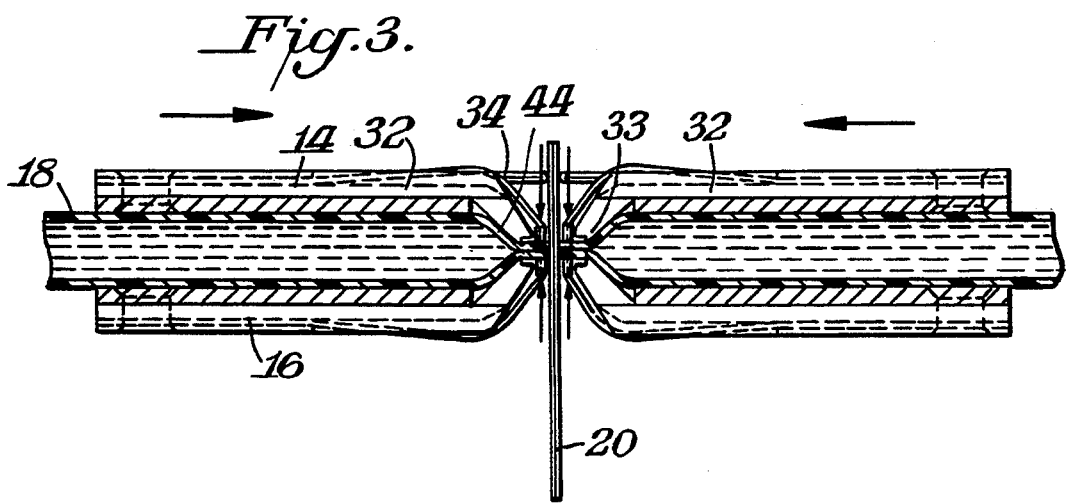
FIG. 3 is a rear elevational view in section of the device shown in FIGS. 1-2.

FIGS. 1-3 illustrate a welder 10 in accordance with this invention. In general, welder 10 is of the construction of the welder disclosed in parent application Ser. No. 965,875 the details of which are incorporated herein by reference thereto. In addition, the details of all of the parent applications are incorporated herein by reference thereto. Welder 10 includes a pair of aligned tube holders 12,12. Each tube holder includes an upper jaw 14 and a lower jaw 16 movable relative to each other to selectively releasably clamp a plastic tube 18 between each set of upper jaw and lower jaw. The tube holders are spaced apart to form a gap between the tube holders 12,12. The ends of the tubes 18,18 extend into the gap slightly spaced from each other. As later described a wafer 20 is moved through the gap and preferably is heated for melting the ends of the tubes so that the melted tube ends could be pressed into contact with each other to connect the tube ends for forming a single unitary tube. Preferably, this is accomplished by a melt- /wipe technique as disclosed in the various parent applications.

The structure of the tube holders and clamp jaws is generally similar to that of parent application Ser. No. 965,875.

FIGS. 6–7 in particular show the details of wafer 20. As shown therein wafer 20 is in the form of a flat plate having a pair of opposite sides 22,22. Wafer 20 also includes a cut-out or notch 24 for engagement by a pawl in the home position of the wafer in the manner described in parent application Ser. No. 965,875. Wafer 20 also includes a pair of wings 26 as described in the various parent applications.

Wafer 20 is unique in that it also includes a scoop 28 on each of its sides. Scoop 28 is located generally in line with wings 26 which would be at an elevation which is in the general plane of the clamped tubes 18 where each upper jaw 14 and lower jaw 16 press against the tube ends to flatten the tube ends. Thus, scoops 28 are in a position to contact the melted tubes.

As best illustrated in FIGS. 1–2 each holder includes a cam element 30 in the form of a pin located at the upstream portion of the gap. Cam elements 30,30 are spaced apart a distance generally equal to the thickness of wafer 20 where its flat sides do not include the scoops or wings. Cam elements 30,30 thus assure the proper positioning of wafer 20 as wafer 20 begins to move through the gap between the holders 12,12. The scoops 28,28 in combination with the cam elements 30,30 are used to control the plastic volume of the weld. The tube ends are preferably melted by the wiping action of the wafer and pressed into contact with each other to form a precise weld connection. The scoops act as debris collectors and make it possible to achieve a means of controlling the tube exterior flange sides for optimal strength and aesthetics. In this manner reliance on rheology of plastic to move excess away from the weld site is avoided. FIG. 10, for example, illustrates a tube end where excess plastic has been removed by the scoops 28,28.

FIGS. 1–2 and 8 illustrate a further feature of this invention wherein each jaw member is of double jaw construction. As shown therein each jaw member includes a base portion or fixed jaw 32 which may be channel shaped to accommodate a spring arm 34. Spring arm 34 functions as a movable jaw. A pressure plate 36 is also disposed in the channel formed at the upper portion of base member 32 to press against spring arm 34. As illustrated in FIG. 8 an elongated opening 38 extends through the base member 32, the spring arm 34 and the pressure plate 36. A suitable fastener, such as a rivet or bolt 40 (FIGS. 1–2) secures these members together. As a result, pressure plate 36 maintains spring arm 34 anchored over about half of its length with the other half hinged at the edge 42 of pressure plate 36.

The formation of a fixed base or jaw member 32 and the spring arm 34 thus results in a double jaw clamp jaw which may be considered spring loaded to effectively press against and seal the tube ends when the first and second clamp jaws 14,16 are moved relatively toward each other. With this double jaw technique a reliable strong tube seal 33 results. One pair of fixed jaws functions to shut off the tubing and preventing the tubing from slipping. The other pair of movable jaws form the seal 33 during the plastic melt process.

In a preferred practice of the invention the double jaw formation has the following characteristics. The fixed jaw spacing is 1.6 millimeters, the jaw tooth size is 0.3 millimeters, the width (flat tube) is 7.3 millimeters, the movable jaw force is 2 lbs., the length of the spring spacer or pressure plate is 16 millimeters.

Very strong seals are made by using wings that are long enough to create a smooth molten plastic pool inside the tubing. This is accomplished by locating the tooth 44 of the fixed jaw 32 as close as possible (e.g. 0.25 mm) to the front 46 of the jaw and by using the movable jaws. Each wing 26 must protrude beyond the tooth 44 of the fixed jaw and into the open inside the tubing.

The spring loaded double jaws insure tube seal as the wings 26 are removed. The spring loaded jaws at a 45° angle of end 46 provide guide edges that funnel the wafer 20 into the centered position. The fixed clamp jaws 32 clamp down to seal the liquid area and thus prevent escape of liquid. A final seal width which in the preferred range is 0.4–0.6 mm as shown in FIG. 12 is preferable.

FIGS. 4A–4E illustrate the use of welder 10 in the connect process. As shown in FIG. 4A the wafer 20 begins to enter the gap between the tube ends. The heated wafer preferably contacts or simply could be near the tube ends to melt the tube ends in the melt-/wipe technique described in the various parent applications. As shown in FIG. 4A the wings 26 and scoops 28 have not yet entered the gap. Although not illustrated in FIGS. 4A–4E the cam elements 30 would assure the proper positioning of the wafer 20 as it passes through the gap.

FIG. 4B illustrates the next sequence in operation wherein the wings 26 begin to enter the inside of each flattened tube end.

FIG. 4C shows the next sequence where the wings are moving out of the gap and scoops 28,28 are removing excess plastic material.

FIG. 4D illustrates the next sequence of operation wherein the wafer is moving out of the gap at which time or slightly thereafter the holders 12,12 begin to move toward each other to press the heated ends of the tubes into contact with each other and thus result in the unitary tube T shown in FIG. 4E.

FIGS. 5A–5E illustrates the same welder 10 used in a disconnect procedure. As shown therein a single tube T would be placed across the holders 12,12 spanning the gap between the holders. The heated wafer 20 would begin to cut through the tube in a melting operation as shown in FIG. 5A.

FIG. 5B illustrates the next sequence in operation wherein the wings 26 enter the cut tube portions.

FIG. 5C illustrates the next sequence in operation wherein the scoops 28 remove excess plastic material.

FIG. 5D illustrates the next sequence where the wafer is exiting from the gap. In this sequence the tube holders 12,12 may be moved toward the wafer to clean the sealed ends by a heating operation.

FIG. 5E illustrates the two separated tube sections resulting from the procedure.

FIG. 9 illustrates the use of the invention for connection or disconnection of a tube section to the tube section communicating with a receptacle or bag 50. As shown therein a bag 50 would have a tube section 52 permanently connected thereto. The arrangement of FIG. 9 illustrates an unopen connection 54 of another tube section terminating in an end seal 56. The end seal may be, for example, 1.5 mm.

FIG. 10 illustrates the flattened end seal 56 is illustrated in its plan view.

The invention may be used for connecting and/or disconnecting plastic tube sections to permit the replacement of various types of receptacles in a system. For example, parent U.S. Pat. No. 5,141,592, the details of which are incorporated herein by reference thereto, describes various applications which may be utilized for practicing the present invention. In such procedures, periodically it would be desired to replace the bag or receptacle 50 with a different bag. For example, the receptacle or bag 50 could be a CAPD bag or a urinary drainage bag and it would be periodically desirable to replace the used bag with a new bag. Additionally, the bag or receptacle 50 may also advantageously be a blood processing receptacle.

The importance of gaining control over the distance, or compression of the molten plastic when making the weld can be understood by a simple analogy. For example, when joining the ends of waxed candles, to make a long candle from short ends, one finds very quickly that not pushing the ends close enough together makes a poor joint. There is not enough molten wax available to form a strong bond. Similarly, if one pushes too hard the molten wax is pushed out of the joint area to where the butt ends are pushing against cold wax. This also makes a weak joint. One learns quickly, therefore, there is an optimum amount of pushing that results in an acceptable joint.

In a general way, this analogy carries over to making strong sterile joints in plastic tubing. Unlike wax candles sterile connection joints require very reliable consistent highest strength welds. To achieve these conditions control of the plastic temperature and compression distance is extremely important. For example, the inventors have established the data shown in FIG. 12 when using medical gray (class 6) PVC tubing 5.4 mm O.D. and 4.0 mm I.D. while maintaining a wafer temperature of 350° C.

As can be seen from FIG. 12 the range for acceptable strength is extremely narrow and therefore the cam control of clamp distance as provided by the present invention is a novel and effective means of administering the controls.

Similarly, the use of cams located on the clamped surfaces can be used to control another vital area of making strong sterile connectings in tubing. When welds are made in tubes that contain liquid (as illustrated in FIGS. 2-3) it is necessary to clamp the tubes in the weld area to avoid liquid escape. During the welding process a membrane is formed within the tube that must be broken to reestablish the liquid flow in the lumen. If the membrane is too thin then liquid flow is not stopped. If the membrane is too thick the liquid flow can not be reestablished. Control of the membrane thickness therefore is important. This control is accomplished by controlling the position of the scoops 28. FIG. 11 illustrates the control area B,B with the seal area A. The seal 58 takes place at portion 56. The scoops 28 under control of the cams 30 for accurate positioning removes the seal area A and the scoops are positioned to obtain reproducible and reliable thickness of the membrane. The invention has the advantages of maximizing the seal strength by controlling the compression distance. Additionally, the cams 30,30 engage the wafer 20 to control the penetration of the wings 26 during the disconnect procedure. The flange height is controlled by removing excess material with scoops 28,28. Cams 30,30 insure that the wafer 20 is properly positioned in a vertical orientation.

FIGS. 13-15 illustrate a modified form of wafer in accordance with this invention. The wafer shown therein would be of generally the same construction as wafer 20 shown in FIGS. 6-7. In FIGS. 13-15, however, the wafer also includes a slit 50 extending completely through the wafer downstream from scoop 28. As illustrated slit 50 extends inwardly from the downstream generally vertical trailing edge in a straight line generally horizontal direction toward the upstream generally vertical leading edge of wafer 20. Slit 50 terminates downstream from scoops 28. Slit 50 may be of any suitable dimension and preferably has a length of 7 mm and a width of 0.5 mm. Slit 50 is disposed in line with scoop 28 and wing 26 on each of the sides 22 of wafer 20.

The advantage of providing a slit, such as slit 50 in the heated wafer downstream from the scoops 28 is to permit the molten material from the tubes 18 to begin contacting each other at an earlier time while the tubes are still in the area of the heated wafer. FIG. 15, for example, shows the molten ends of tubes 18 to enter the slit 50 before the wafer 20 has completely cleared contact with the tubes 18,18. The resultant joint, which is illustrated in FIG. 16, after the tubes have been opened into communication with each other is of increased strength leaving only a slight residue 52,52 at the joint.

The invention has the advantages of assured sterility and maximum weld strength. The invention could be used with a wide range of plastic materials such as PVC, polyurethane, hytrel, nylon, polyethylene, polypropylene and various compositions of Teflon. The invention results in improved aesthetics and in the control of the lumen re-opening requirements.

What is claimed is:

1. A device for selectively connecting and disconnecting plastic tubes comprising a pair of aligned tube holders spaced from each other to form a gap therebetween, each of said holders having a first clamp jaw and a second clamp jaw movable relative to each other to selectively releasably clamp a plastic tube in a general plane between said first clamp jaw and said second clamp jaw with a portion of the plastic tube extending into said gap, a wafer mounted for movement through said gap, said wafer being in the from of a flat plate having opposite sides, each of said sides of said wafer being disposed toward a respective set of said first and second clamp jaws, and each of said sides of said wafer having an outwardly extending scoop generally located in said plane between said first and second clamp jaws for removing plastic material from the plastic tubes as said wafer moves through said gap.

2. The device of claim 1 wherein each of said holders includes a cam extending into said gap and being aligned with each other and spaced apart a distance generally equal to the thickness of said wafer, and said cams being located in the path of motion of said wafer at a portion of said wafer other than said scoops.

3. The device of claim 2 wherein each of said cams comprises a pin mounted to its said holder at a downstream portion of said gap.

4. The device of claim 3 wherein said wafer includes a wing on each of said sides, and each of said wings being generally in line with its respective scoop on the same side of respective wafer.

5. The device of claim 4 wherein said wafer is a heated wafer, and each of said scoops having an open end disposed toward said wing with said scoop otherwise forming a closed collecting pocket.

6. The device of claim 5 wherein each of said jaws is in the form of a double jaw comprising a fixed jaw and a movable jaw, said fixed jaw being a base portion, and said movable jaw being a spring arm mounted to said base portion.

7. The device of claim 6 wherein said base portion includes a channel, said spring arm being mounted in said channel, a pressure plate being mounted in said channel, against said spring arm, and a fastener securing said pressure plate and said spring arm to said base portion in said channel.

8. The device of claim 5 wherein said wafer includes a generally straight line slit extending from an edge of said wafer completely therethrough, and said slit being generally in line with and downstream from said scoops.

9. The device of claim 1 wherein said wafer includes a generally straight line slit extending from an edge of said wafer completely therethrough, and said slit being generally in line with and downstream from said scoops.

10. The device of claim 1 wherein said wafer includes a wing on each of said sides, and each of said wings being generally in line with its respective scoop on the same side of respective wafer.

11. The device of claim 1 wherein said wafer is a heated wafer, and each of said scoops having an open end with said scoop otherwise forming a closed collecting pocket.

12. The device of claim 1 wherein each of said jaws is in the form of a double jaw comprising a fixed jaw and a movable jaw, said fixed jaw being a base portion, and said movable jaw being a spring arm mounted to said base portion.

13. A device for selectively connecting and disconnecting plastic tubes comprising a pair of aligned tube holders spaced from each other to form a gap therebetween, each of said holders having a first clamp jaw and a second clamp jaw movable relative to each other to selectively releasably clamp a plastic tube in a general plane between said first clamp jaw and said second clamp jaw with a portion of the plastic tube extending into said gap, a wafer mounted for movement through said gap, said wafer being in the from of a flat plate having opposite sides, each of said sides of said wafer being disposed toward a respective set of said first and second clamp jaws, each of said holders having a cam extending into said gap, and said cams being aligned with each other and spaced apart a distance generally equal to the thickness of said wafer between said sides of said wafer for guiding said wafer as said wafer moves through said gap.

14. The device of claim 13 wherein each of said cams comprises a pin mounted to said holder at the downstream portion of said gap.

15. A device for selectively connecting and disconnecting plastic tubes comprising a pair of aligned tube holders spaced from each other to form a gap therebetween, each of said holders having a first clamp jaw and a second clamp jaw movable relative to each other to selectively releasably clamp a plastic tube in a general plane between said first clamp jaw and said second clamp jaw with a portion of the plastic tube extending into said gap, a wafer mounted for movement through said gap, said wafer being in the from of a flat plate having opposite sides, each of said sides of said wafer being disposed toward a respective set of said first and second clamp jaws, each of said jaws is in the form of a double jaw comprising a fixed jaw and a movable jaw, said fixed jaw being a base portion having a tube contacting surface, said movable jaw being a spring arm mounted to said base portion, and said spring arm terminating a tube contacting portion whereby a tube is contacted by both said base portion and said spring arm during the clamping action of the tube.

16. The device of claim 15 wherein said base portion includes a channel, said spring arm being mounted in said channel, a pressure plate being mounted in said channel against said spring arm, and a fastener securing said pressure plate and said spring arm to said base portion in said channel.

* * * * *